INVENTOR.
RICHARD H. GOHEEN

# United States Patent Office 3,729,542
Patented Apr. 24, 1973

3,729,542
PURIFICATION OF SODIUM ALUMINATE LIQUOR
Richard H. Goheen, O'Fallon, Ill., assignor to Aluminum Company of America, Pittsburgh, Pa.
Continuation of abandoned application Ser. No. 824,156, May 13, 1969. This application Aug. 27, 1971, Ser. No. 175,708
Int. Cl. C01f 7/02, 7/06
U.S. Cl. 423—119
6 Claims

ABSTRACT OF THE DISCLOSURE

Use of iron grit or shot to purify sodium aluminate liquor, especially sodium aluminate liquor resulting from caustic digestion of low-iron bauxite.

Figure 1:
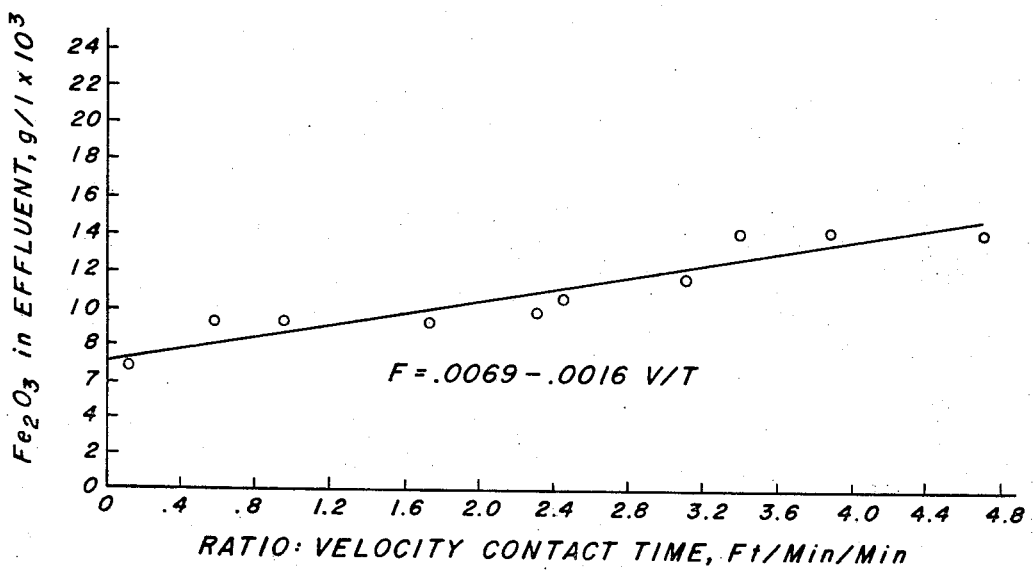

This application is a continuation of Ser. No. 824,156, filed May 13, 1969 and now abandoned.

BACKGROUND OF THE INVENTION

This invention relates to removal of impurities from sodium aluminate liquor. More particularly, it relates to a method of reducing the content of iron and other impurities generally present in sodium aluminate liquor.

The digestion of aluminum-containing minerals and clays or the like, especially those having a relatively low iron content, for example, Arkansas bauxite, oftentimes produces a sodium aluminate liquor, sometimes referred to as green liquor, of a high content of iron and other impurities such as calcium, magnesium, manganese, titanium and the like. This results in the alumina precipitated from such liquor having a higher impurity content than permissible for smelting-grade and ceramic-grade alumina. Various filtering methods, magnetic methods and methods of agglomeration by use of additives have been proposed to reduce the impurity content to the desired level, but thus far none has proved entirely satisfactory in producing as consistently low an iron level as sought by the aluminum industry.

Several U.S. Patents disclose use of iron-containing filters for removing various impurities from water or the like but are silent as to use of such filters for removal of impurities from sodium aluminate liquor. For example, U.S. 293,741 has to do with a filter bed made up of a mixture of iron and an inert material such as sand thoroughly commingled for filtering water. U.S. 440,539 concerns use of iron-stone, which the patentee identifies as an argillaceous carbonate of iron commonly known as "clay iron-stone," for purification of water and other liquids, and of gases. U.S. 634,642 describes use of metallic particles such as iron for cooperation with a granular filter-bed by arrangement in or upon the top thereof for precipitating and removing impurities from water. U.S. 2,554,343 discloses a fluid-permeable metallic filter made up of an anisometric network in sheet form of interconnected aggregates of united metal particles of an iron-cobalt-nickel-chromium alloy for industrial or laboratory filtering operations. As mentioned above, however, none of the foregoing patents has given any hint as to how to solve the problem discussed hereinabove of how to reduce the iron or like impurity content of sodium aluminate liquor.

SUMMARY OF THE INVENTION

It is therefore one object of this invention to provide a method for removing impurities from sodium aluminate liquor. Another object is to provide a method for reducing the impurity content of a high-iron sodium aluminate liquor such as typified by that produced by caustic digestion of a low-iron Arkansas bauxite. Further objects will be apparent from the description and claims which follow.

In its broader aspects my invention involves use of iron, for example in the form of iron grit or iron shot, as a filter for lowering the iron and other impurity content of sodium aluminate liquor. Quite unexpectedly, iron, which would be expected to repel iron because of the well-known magnetic law that likes repel likes, somehow attracts the iron and other undesirable impurities in sodium aluminate liquor. When I say iron and other impurities in referring to the impurities to be removed from the sodium aluminate liquor, I mean iron and other impurities in any form, for example, elemental or combined, for example, as the oxide, and in solid, solution, or colloidal form. When I say iron in referring to the material used according to my invention as a filter for removal of iron impurity from sodium aluminate liquor, I mean elemental iron, except for possible slight oxidation of the surface to be expected from exposure to normal environmental conditions, and substantially pure except for incidental very small amounts of other metallic impurities or the like not exceeding about 5% by weight. I prefer to use cast iron although other types of iron are also useful according to my invention.

The sodium aluminate liquor is filtered by gravity according to my invention through a bed of the iron, preferably in the form of grit or shot. While I do not wish to be bound by any particular theory, it may be that the high surface area of the iron grit or shot contributes to the efficiency of reduction of the impurities in the sodium aluminate liquor. I prefer to support the iron as a bed on a screen, which may be of stainless steel or iron. The screen may be further supported by a perforated plate, which may also be of stainless steel, iron, or other suitable material.

It is possible according to my invention to lower iron content from about 0.018–0.030 g./l., which is the average iron content of sodium aluminate feed liquor obtained by conventional digestion, of an alumina source such as bauxite, solids removal and filtering, for example, by pressing, to obtain what is commonly referred to as clear pressed green liquor, to 0.004–0.018 g./l. or less, which is the average iron content of the effluent liquor after gravity filtration of green liquor through the iron filter used in my invention.

The preferred liquor linear velocity is 0.19–4.9 ft./min. and the preferred contact time 0.44–7.7 min. I have found that the amount of iron or like impurity in the effluent liquor is generally a function of the velocity to contact time ratio. While I have been successful in obtaining as low an iron content in the effluent liquor as 0.018 g./l. at a ratio of as high as 123 (velocity of 11.1 ft./min. and contact time of 0.09 min.), my preferred ratio of velocity to contact time for best results is 0.037–6.1 ft./min./min. For most satisfactory results I have found useful according to my invention a bed 1–4 ft. in depth and a liquor head not exceeding about 2 ft. in depth. These conditions permit an average linear velocity of about 1.5 ft./min. through —12 to +18 mesh cast iron grit.

As indicated above, in removing iron, for example, as iron oxide, I have found that I also lower the content of other impurities, for example, when expressed as oxides, $MnO$, $MgO$, $CuO$, $TiO_2$ and $CaO$.

One advantage of my invention is that the iron filter bed may be easily rejuvenated by first washing green liquor from the bed, then treating the bed with mineral acid, and finally washing the acid from the bed.

For a better understanding of my invention reference will now be made to the drawings in which:

FIG. 1 is a graph in which the iron content expressed as $Fe_2O_3$ in the effluent liquor in g./l.$\times 10^3$ is plotted against the ratio of the velocity to contact time in ft./min./min.

liquor filtered through iron according to the present invention.

EFFECT OF IRON GRIT FILTRATION PROCESS ON THE LEVEL OF SPECIFIED IMPURITIES IN THE PRECIPITATED ALUMINA

| Velocity to contact time, ft./min./min. | Gal./ft.³ treated | CaO | | CuO | | MgO | | MnO | | TiO² | |
|---|---|---|---|---|---|---|---|---|---|---|---|
| | | A¹ | B² | A¹ | B² | A¹ | B² | A¹ | B² | A¹ | B² |
| 0.9 | 60 | 0.073 | 0.068 | 0.0007 | 0.0009 | 0.0032 | 0.0012 | 0.0011 | 0.0009 | 0.006 | 0.005 |
| 0.1 | 110 | .100 | .068 | .0012 | .0009 | .0069 | .0005 | .0011 | .0011 | .007 | .003 |
| 2.3 | 76 | .075 | .075 | .0009 | .0005 | .0034 | .0015 | .1003 | .0007 | .005 | .001 |
| 2.6 | 127 | .106 | .087 | .0005 | .0005 | .0054 | .0034 | .0011 | .0007 | .005 | .001 |
| 0.1 | 105 | .085 | .072 | .0005 | .0005 | .0085 | .0066 | .0011 | .0004 | .003 | .001 |
| Average | | | | | | .0056 | .0027 | | | | |
| 0.9 | 21 | ³.027 | .010 | ³.0113 | .0030 | ³.0006 | .0013 | ³.0023 | .0008 | ³.004 | .003 |
| 0.8 | 26 | | .013 | | .0010 | | .0005 | | .0003 | | .001 |
| 0.9 | 73 | | .018 | | .0013 | | .0005 | | .0003 | | .001 |
| 1.1 | 220 | | .022 | | .0007 | | .0005 | | .0003 | | .001 |
| 1.3 | 320 | | .022 | | .0007 | | .0005 | | .0005 | | .001 |
| 1.3 | 420 | | .025 | | .0005 | | .0005 | | .0007 | | .001 |
| 1.0 | 520 | | .025 | | .0010 | | .0005 | | .0007 | | .001 |

¹ Percent impurity in alumina precipitated from clear-pressed liquor.
² Percent impurity in alumina precipitated from clear-pressed and filtered liquor.
³ One sample of feed liquor taken at start of run.

Figure 2:
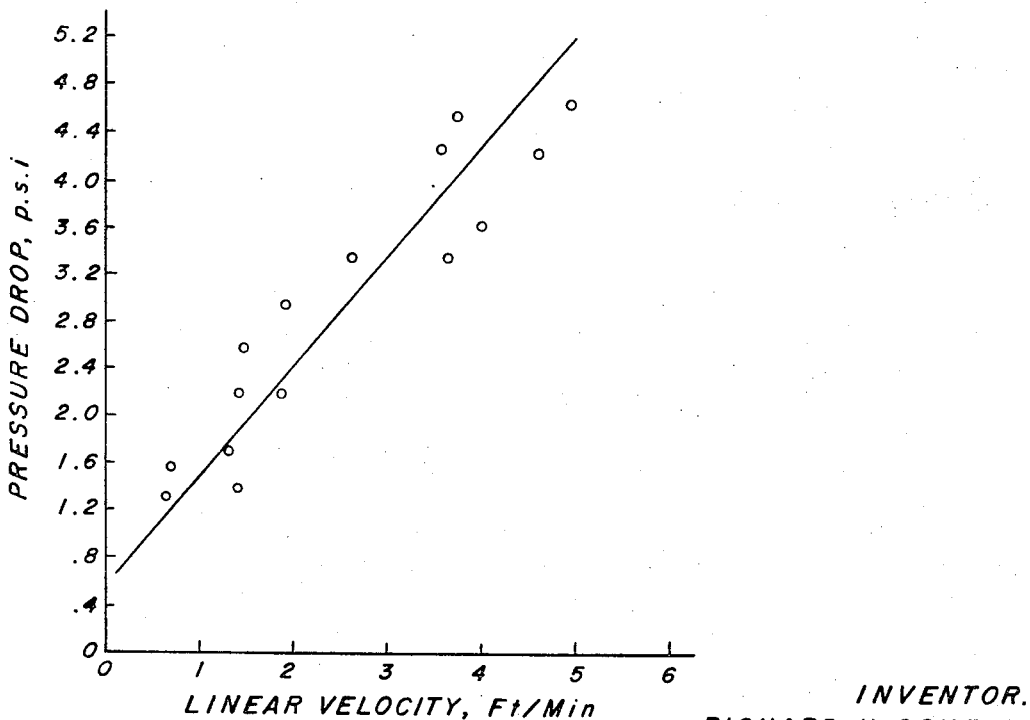

FIG. 2 is a graph of the pressure drop of the iron filter bed in p.s.i. versus the linear velocity through the filter of the effluent being filtered in feet per minute.

A linear relationship is apparent between both the factors plotted in FIG. 1 and those plotted in FIG. 2.

The following examples are further illustrative of my invention. In the examples grams per liter (g./l.) were determined colorimetrically, and percent figures were obtained from quantometric analysis.

Example 1

Sixty-five (65) samples of sodium aluminate green liquor containing between 0.018 and 0.030 g./l. $Fe_2O_3$ and averaging about 0.024 g./l. were filtered through a bed of iron grit 1–4 ft. in depth at a liquor linear velocity of 0.19 to 4.9 ft./min. and a contact time of 0.44–7.7 min. The filtered liquor (effluent) in each case was analyzed for iron content and found to contain from 0.004 to 0.018 g./l. $Fe_2O_3$. Alumina precipitated from the filtered liquor (effluent) from five of these samples contained an average of 0.022% by weight $Fe_2O_3$, as compared to an average for iron content of alumina precipitated from unfiltered liquor (feed) for the same five samples of 0.063% $Fe_2O_3$.

Example 2

First, liquor flow to an iron filter unit for sodium aluminate liquor was stopped and the liquor remaining in the bed allowed to drain. Approximately 65% of the liquor drained from the bed within four minutes. The residual liquor was washed from the particles with a neutral solution to prevent neutralization of the acid which was used to rejuvenate the bed.

Second, the bed was treated with a weak solution of sulfuric acid. Static contact for five minutes with as little as four gallons of a 5% solution of inhibited sulfuric acid per cu. ft. of packing successfully rejuvenated the bed.

Third, all traces of acid were removed from the bed. Any acid which did not drain from the bed within one to five minutes was washed from the bed with a neutral solution.

The successful use of the same cast iron particles in nine iron-removal cycles showed that a fouled bed could be rejuvenated repeatedly with no apparent effect on the ability of the iron particles to remove iron from liquor. The use of inhibited acid reduced the corrosion of the bed, thereby lengthening the bed life.

Example 3

An iron grit filter was used to remove impurities from Bayer process sodium aluminate liquor. The following table reports the percentage of various impurities, expressed as oxides, found in alumina precipitated from conventional clear-pressed liquor and from clear-pressed liquor filtered through iron according to the present invention.

While the invention has been described in terms of preferred embodiments, the claims appended hereto are intended to encompass all embodiments which fall within the spirit of the invention.

Having thus described my invention and certain preferred embodiments thereof, I claim:

1. In a process for refining an iron-containing alumina source material which comprises caustic digestion of the material to obtain a sodium aluminate green liquor, the improvement comprising passing the liquor through a bed of discrete iron particles, thereby reducing the iron content of said liquor expressed as $Fe_2O_3$ from a higher level to from about 0.004 to about 0.018 g./l.

2. The improvement of claim 1 wherein the discrete iron particles comprise iron grit or iron shot.

3. The improvement of claim 1 wherein the source material comprises a low-iron bauxite.

4. The improvement of claim 1 wherein the liquir passed through the bed has a linear velocity of 0.19 to 4.9 feet per minute, a contact time of 0.44 to 7.7 minutes between entrance to the bed and exit therefrom, the ratio of said velocity to said contact time is 0.037 to 6.1 feet per minute per minute, the depth of the bed is 1 to 4 feet and the iron is in the form of iron grit or iron shot.

5. The improvement of claim 1 wherein after a period of time sufficient to foul the bed to an extent that it is ineffective for reducing the iron content of the liquor the liquor is washed from the bed, the bed is then treated with mineral acid, and next the acid is washed from the bed, the bed thereby being made once again effective for reducing the iron content of the liquor.

6. The improvement of claim 1 wherein after the caustic digestion, solids are separated from the green liquor prior to said passing the liquor through said bed of discrete iron particles.

References Cited

UNITED STATES PATENTS

| 293,741 | 2/1884 | Hyatt | 210—500 U |
| 440,539 | 11/1890 | Candy. | |
| 2,442,226 | 5/1948 | Wall | 423—121 |
| 3,002,809 | 10/1961 | Walker | 423—121 |
| 1,689,951 | 10/1928 | Lofland. | |
| 3,259,571 | 7/1966 | Marshall et al. | 210—500 X |
| 3,493,327 | 2/1970 | Cook | 432—119 UX |
| 3,457,032 | 7/1969 | La Breteque | 423—625 |

FOREIGN PATENTS 619,192  4/1961  Canada.

HERBERT T. CARTER, Examiner

U.S. Cl. X.R.

210—500; 423—120, 121, 625